(12) United States Patent
Kosaka et al.

(10) Patent No.: US 12,325,211 B2
(45) Date of Patent: Jun. 10, 2025

(54) GLASS PLATE WITH RESIN FRAME AND METHOD FOR PRODUCING GLASS PLATE WITH RESIN FRAME

(71) Applicant: AGC Inc., Tokyo (JP)

(72) Inventors: Yoshio Kosaka, Tokyo (JP); Kazuhiro Takahashi, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 18/210,080

(22) Filed: Jun. 15, 2023

(65) Prior Publication Data

US 2023/0321956 A1 Oct. 12, 2023

Related U.S. Application Data

(63) Continuation of application No. PCT/JP2021/045952, filed on Dec. 14, 2021.

(30) Foreign Application Priority Data

Dec. 18, 2020 (JP) ................................. 2020-209778

(51) Int. Cl.
*B32B 3/10* (2006.01)
*B29C 45/14* (2006.01)
(Continued)

(52) U.S. Cl.
CPC .. *B32B 17/10247* (2013.01); *B29C 45/14336* (2013.01); *B29C 45/14688* (2013.01); *B32B 3/08* (2013.01); *B32B 7/022* (2019.01); *B32B 17/10018* (2013.01); *B32B 17/10651* (2013.01); *B32B 17/10743* (2013.01); *B32B 17/10752* (2013.01); *B60J 1/08* (2013.01);
(Continued)

(58) Field of Classification Search
None
See application file for complete search history.

(56) References Cited

U.S. PATENT DOCUMENTS

2012/0025554 A1* 2/2012 Hasegawa .............. C25D 13/12
296/1.08

FOREIGN PATENT DOCUMENTS

JP 2003025837 A * 1/2003
JP 2007-015555 A 1/2007
(Continued)

OTHER PUBLICATIONS

Machine translation of JP-2014104707-A (Year: 2014).*
(Continued)

*Primary Examiner* — Christopher M Polley
(74) *Attorney, Agent, or Firm* — Foley & Lardner LLP

(57) ABSTRACT

To provide a glass plate with resin frame and a method for producing a glass plate with resin frame, by which high gloss of a design surface with a color expressed by a decorative molding can be achieved.

A glass plate 10 with resin frame, which comprises a glass plate 12, a resin frame 14 provided on a peripheral portion of the glass plate 12, and a decorative molding 16 disposed on the resin frame 14, the resin frame 14 being formed integrally with the glass plate 12 and the decorative molding 16,
wherein the decorative molding 16 is a transparent design film, and
when the glass plate 10 with resin frame is attached to a vehicle, the decorative molding 16 is disposed on the vehicle exterior side.

11 Claims, 7 Drawing Sheets

(51) Int. Cl.
    *B32B 3/08*     (2006.01)
    *B32B 7/022*     (2019.01)
    *B32B 17/10*     (2006.01)
    *B60J 1/08*     (2006.01)
    *B60R 13/04*     (2006.01)
    *B29K 633/00*     (2006.01)
    *B29K 669/00*     (2006.01)
    *B29K 709/08*     (2006.01)
    *B29L 31/30*     (2006.01)

(52) U.S. Cl.
    CPC .......... *B60R 13/04* (2013.01); *B29K 2633/00* (2013.01); *B29K 2669/00* (2013.01); *B29K 2709/08* (2013.01); *B29K 2995/0026* (2013.01); *B29L 2031/30* (2013.01); *B32B 2307/402* (2013.01); *B32B 2307/412* (2013.01); *B32B 2307/558* (2013.01); *B32B 2605/006* (2013.01)

(56) References Cited

FOREIGN PATENT DOCUMENTS

| | | |
|---|---|---|
| JP | 2008-094061 A | 4/2008 |
| JP | 2008-270021 A | 11/2008 |
| JP | 2010-215134 A | 9/2010 |
| JP | 2014104707 A * | 6/2014 |
| JP | 2019-209614 A | 12/2019 |

OTHER PUBLICATIONS

Machine translation of JP-2003025837-A (Year: 2003).*
International Searching Authority, "International Search Report," issued in connection with International Patent Application No. PCT/JP2021/045952, dated Mar. 8, 2022.
International Searching Authority, "Written Opinion," issued in connection with International Patent Application No. PCT/JP2021/045952, dated Mar. 8, 2022.

* cited by examiner

GLASS PLATE WITH RESIN FRAME AND METHOD FOR PRODUCING GLASS PLATE WITH RESIN FRAME

CROSS-REFERENCE TO RELATED PATENT APPLICATIONS

This application is a continuation of PCT Application No. PCT/JP2021/045952, filed on Dec. 14, 2021, which is based upon and claims the benefit of priority from Japanese Patent Application No. 2020-209778, filed on Dec. 18, 2020. The contents of those applications are incorporated herein by reference in their entireties.

TECHNICAL FIELD

The present invention relates to a glass plate with resin frame for a vehicle window having a resin frame and a decorative molding on the resin frame, and a method for producing the glass plate with resin frame.

BACKGROUND ART

Among glass plates for a vehicle window, particularly glass plates for an automobile, for example for side glass fixed to an opening for a vehicle window, have a resin frame to fill a gap between the glass plate and the opening for a vehicle window provided integrally on a peripheral portion of the glass plate in many cases. By such a resin frame, the glass plate is fixed to the opening for a vehicle window and the opening for a vehicle window is sealed, and further, the design of the appearance of the glass plate is to be improved.

The resin frame is, for example, formed integrally with the glass plate in such a manner that a primer (adhesive) is applied to a peripheral portion of the glass plate, the glass plate is attached to a mold, and a molten resin is injected into a cavity of the mold, whereby a glass plate with resin frame having the resin frame formed integrally on a peripheral portion of the glass plate is produced. The applicant discloses such a glass plate with frame (tradename: MAW (registered trademark: Module Assy Window)), in e.g. the following Patent Document 1.

On the other hand, some glass plates have a decorative molding (also called "decorating molding") provided on the surface of the resin frame visible from outside, for the purpose of decorating or reinforcing the resin frame (see the following Patent Document 2).

The following Patent Document 2 discloses that the shaped portion of the decorating molding fixed to a frame at the time of injection-molding the frame, is formed of a resin or a metal, and to the shaped portion, a resin film formed of a resin such as a polyvinyl chloride resin is attached. The document further discloses that the resin film is colored with a pigment.

PRIOR ART DOCUMENTS

Patent Documents

Patent Document 1: JP-A-2008-270021
Patent Document 2: JP-A-2010-215134

DISCLOSURE OF INVENTION

Technical Problem

As described above, with respect to a conventional glass plate with resin frame, the resin frame is decorated by coloring the resin film itself of the decorative molding. However, the decorative molding of which the resin film itself is colored, has such problems that achievement of high gloss (high brightness) is limited, and a desired color tone can hardly be expressed.

Under these circumstances, the object of the present invention is to provide a glass plate with resin frame and a method for producing a glass plate with resin frame, in which high gloss of a design surface with a color expressed by a decorative molding can be achieved.

Solution to Problem

According to an embodiment of the present invention, to achieve the object of the present invention, provided is a glass plate with resin frame, which comprises a glass plate, a resin frame provided on a peripheral portion of the glass plate, and a decorative molding disposed on the resin frame, the resin frame being formed integrally with the glass plate and the decorative molding,
 wherein the decorative molding is a transparent design film, and
 when the glass plate with resin frame is attached to a vehicle, the decorative molding is disposed on the vehicle exterior side.

According to another embodiment of the present invention, to achieve the object of the present invention, provided is a method for producing a glass plate with resin frame for a vehicle window, comprising a resin frame formed integrally with a glass plate and a decorative molding, which comprises:
 shaping a transparent film into a design shape to prepare the decorative molding,
 attaching the decorative molding and the glass plate to a mold for forming the resin frame, and
 injecting a molten resin into a cavity space of the mold to produce the glass plate with resin frame.

Advantageous Effects of Invention

According to such embodiments of the present invention, high gloss of a design surface with a color expressed by a decorative molding can be achieved.

DESCRIPTION OF EMBODIMENTS

Now, embodiments of the glass plate with resin frame and the method for producing the glass plate with resin frame of the present invention will be described with reference to the drawings.

Figure 1:
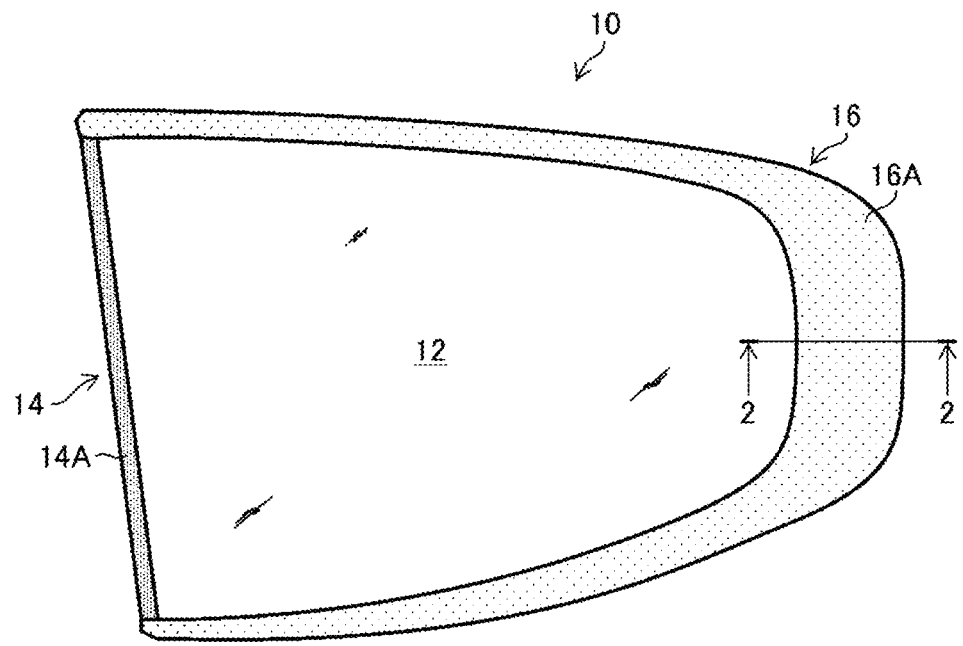
FIG. 1 is a plan view illustrating a glass plate with resin frame according to an embodiment of the present invention.
Figure 2:
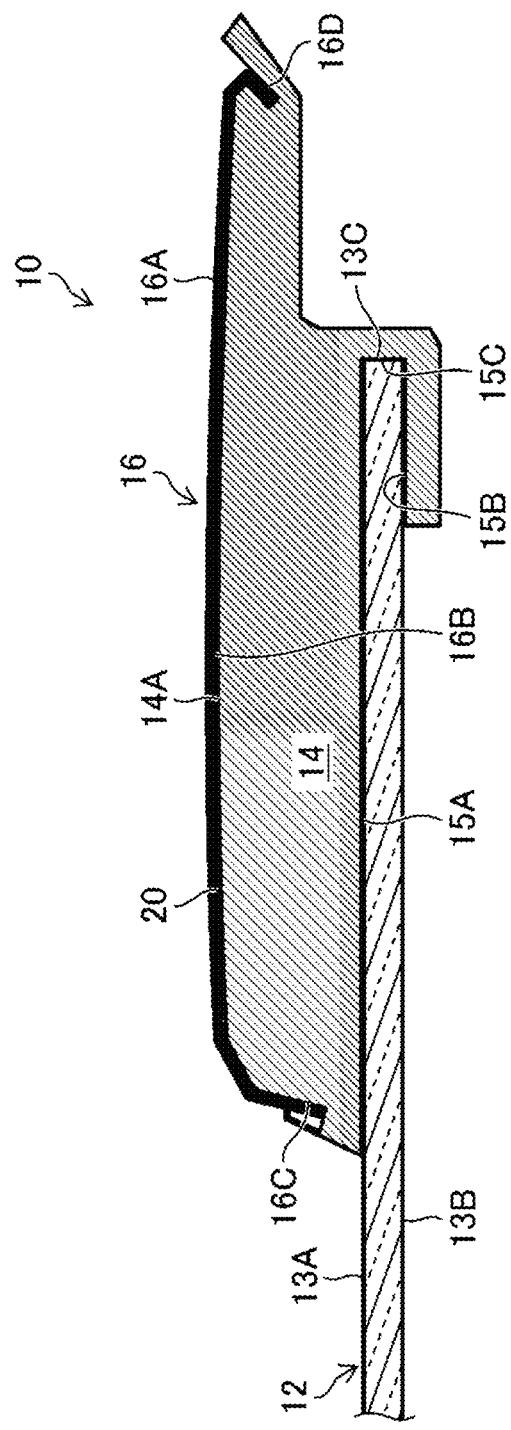
FIG. 2 is a cross sectional view illustrating the glass plate with resin frame shown in FIG. 1 along the line 2-2.

FIG. 1 is a plan view illustrating a glass plate 10 with resin frame according to an embodiment of the present invention, produced by the method for producing the glass plate with resin frame according to an embodiment of the present invention. FIG. 2 is a cross sectional view illustrating the glass plate 10 with resin frame shown in FIG. 1 along the line 2-2. In the drawings in this specification, the respective members are described as magnified, not in actual dimensions, to help understand the invention.

[Glass Plate with Resin Frame]

The glass plate 10 with resin frame for a vehicle window shown in FIGS. 1 and 2 is employed, for example, for rear quarter glass of an automobile. The glass plate 10 with resin frame comprises a glass plate 12, a resin frame 14 provided on the peripheral portion of the glass plate 12, and a decorative molding 16 disposed on the surface 14A of the resin frame 14. And, the resin frame 14 is formed integrally with the glass plate 12 and the decorative molding 16. The surface 14A of the resin frame 14 is a face facing the vehicle exterior side when the glass plate 10 with resin frame is attached to an opening (not shown) for a vehicle window, and functions as a design surface expressed by the decorative molding 16 as described later.

<Glass Plate>

The glass plate 12 shown in FIG. 1 is formed in substantially rectangular as view in a plan view. However, the shape of the glass plate 12 is not limited to substantial rectangular and may be e.g. substantial triangular. The glass plate 12 may be formed of inorganic glass or organic glass. As the inorganic glass, soda lime glass, aluminosilicate glass, borosilicate glass, alkali free glass or quartz glass may, for example, be used without any particular restriction. Among them, in view of production cost and forming property, soda lime glass is particularly preferred. The method for forming the glass plate 12 is not particularly limited and for example, in the case of inorganic glass, preferred is a glass plate formed by e.g. float process.

In a case where the glass plate 12 is formed of inorganic glass, the glass plate 12 may be either non-tempered glass or tempered glass. Non-tempered glass is one obtained by shaping molten glass into a plate, followed by annealing. Tempered glass is one having a compression stress layer formed on the surface of non-tempered glass, and may be either air-tempered glass or chemically tempered glass.

In a case where the tempered glass is physically tempered glass (for example air-tempered glass), the glass surface may be tempered by forming a compression stress layer on the glass surface by a temperature difference between the glass surface and the glass interior, by an operation other than annealing, for example by quenching a glass plate uniformly heated in bending, from a temperature in the vicinity of the softening point. In a case where tempered glass is chemically tempered glass, the glass surface may be tempered by forming compression stress on the glass surface e.g. by ion exchange method, after bending. Further, glass which absorbs ultraviolet light or infrared rays may also be used. Further, the glass plate 12 is preferably transparent, but may be colored to an extent not to impair transparency.

The glass plate 12 may be single curved such that it is bent only in one direction or may be complex curved such that it is bent in two directions (for example in a predetermined direction and in a direction orthogonal to the predetermined direction). For bending the glass plate 12, gravity forming, press forming or roller forming may, for example, be employed. In a case where the glass plate is bent in a predetermined curvature, the radius of curvature of the glass plate 12 may be from 1,000 to 100,000 mm.

The glass plate 12 may be a single plate or may, for example, be laminated glass having two or more glass plates bonded via an interlayer. As an example of the interlayer of the laminated glass, a known thermoplastic resin film formed of e.g. polyvinyl butyral (PVB) or an ethylene/vinyl acetate copolymer resin (EVA) may be mentioned. The interlayer of the laminated glass may be transparent or may be colored. Two or more interlayers may be used.

In a case where the glass plate 12 is laminated glass, the thickness of glass to be located on the exterior side when the glass plate 12 is attached to a vehicle, and the thickness of glass to be located on the interior side, may be the same or different from each other. The thickness of the glass to be located on the exterior side when the glass plate 12 is attached to a vehicle, is preferably 1.0 mm or more and 3.0 mm or less. When the thickness of the glass plate located on the exterior side is 1.0 mm or more, strength such as flying stone resistance will be sufficient, and when it is 3.0 mm or less, the mass of the laminated glass will not be too large, such being favorable in view of mileage of the vehicle. The thickness of the glass plate to be located on the interior side is preferably 0.3 mm or more and 2.3 mm or less. When the plate thickness of the glass plate located on the vehicle interior side is 0.3 mm or more, handling efficiency will be good, and when it is 2.3 mm or less, the mass will not be too large. When the thickness of the glass located on the exterior side and the thickness of the glass located on the interior side are respectively 1.8 mm or less, both weight saving of the glass plate 12 and sound shielding property can be satisfied. The glass to be located on the interior side may be chemically tempered glass. In a case where the glass to be located on the interior side is chemically tempered glass, the compression stress on the glass surface is preferably 300 MPa or more, and the depth of the compression stress layer is preferably 2 µm or more.

In a case where the glass plate 12 is a single plate, the glass plate 12 is preferably air-tempered glass, and in such a case, the thickness of the glass plate 12 is preferably 1.8 mm or more and 5.0 mm or less.

In a case where the glass plate 12 is formed of organic glass, as the material of the organic glass, a transparent resin such as a polycarbonate or an acrylic resin (such as polymethyl methacrylate) may be mentioned.

<Resin Frame>

The resin frame 14 is provided, for example, to surround the entire periphery of the glass plate 12. As the material of the resin frame 14, a synthetic resin such as polyvinyl chloride (PVC) or a thermoplastic elastomer (TPE) may, for example, be mentioned. Further, as the thermoplastic elastomer (TPE), a polyolefin thermoplastic elastomer (TPO) may, for example, be mentioned. The resin frame 14 is formed in such a manner that into a mold 30 (see FIG. 4) having a cavity with a shape corresponding to the resin frame 14, the glass plate 12 and the decorative molding 16 are attached, and a melt of the above synthetic resin (hereinafter sometimes referred to as molten resin) is injected into the cavity, whereby the resin frame 14 provided so as to surround the glass plate 12.

The resin frame 14 of this example is colored black by addition of carbon black to the above synthetic resin, and the black surface 14A functions as a design surface. The color of the resin frame 14 is not limited to black, and may be another color. Further, the resin frame 14 of this example is, as shown in FIG. 2, a so-called three-sided molding having three inner faces 15A, 15B and 15C respectively in contact with the vehicle exterior side surface 13A, the vehicle interior side surface 13B and the edge surface 13C of the glass plate 12.

<Decorative Molding>

The decorative molding 16 has the following design shape. That is, the decorative molding 16 is rectangular or frame-shaped as viewed in a plan view, and is formed along the surface 14A of the resin frame 14. By the decorative molding 16 being provided on the surface 14A of the resin frame 14, the decorative molding 16 has a front surface 16A exposed on the surface 14A of the resin frame 14, a rear surface 16B facing the surface 14A of the resin frame 14, and edge portions 16C and 16D on both ends embedded in the resin frame 14. When the glass plate 10 with resin frame is attached to a vehicle, the front surface 16A faces the vehicle exterior side and thus functions as a first face, and the rear surface 16B faces the vehicle interior side and thus functions as a second face.

Figure 3:
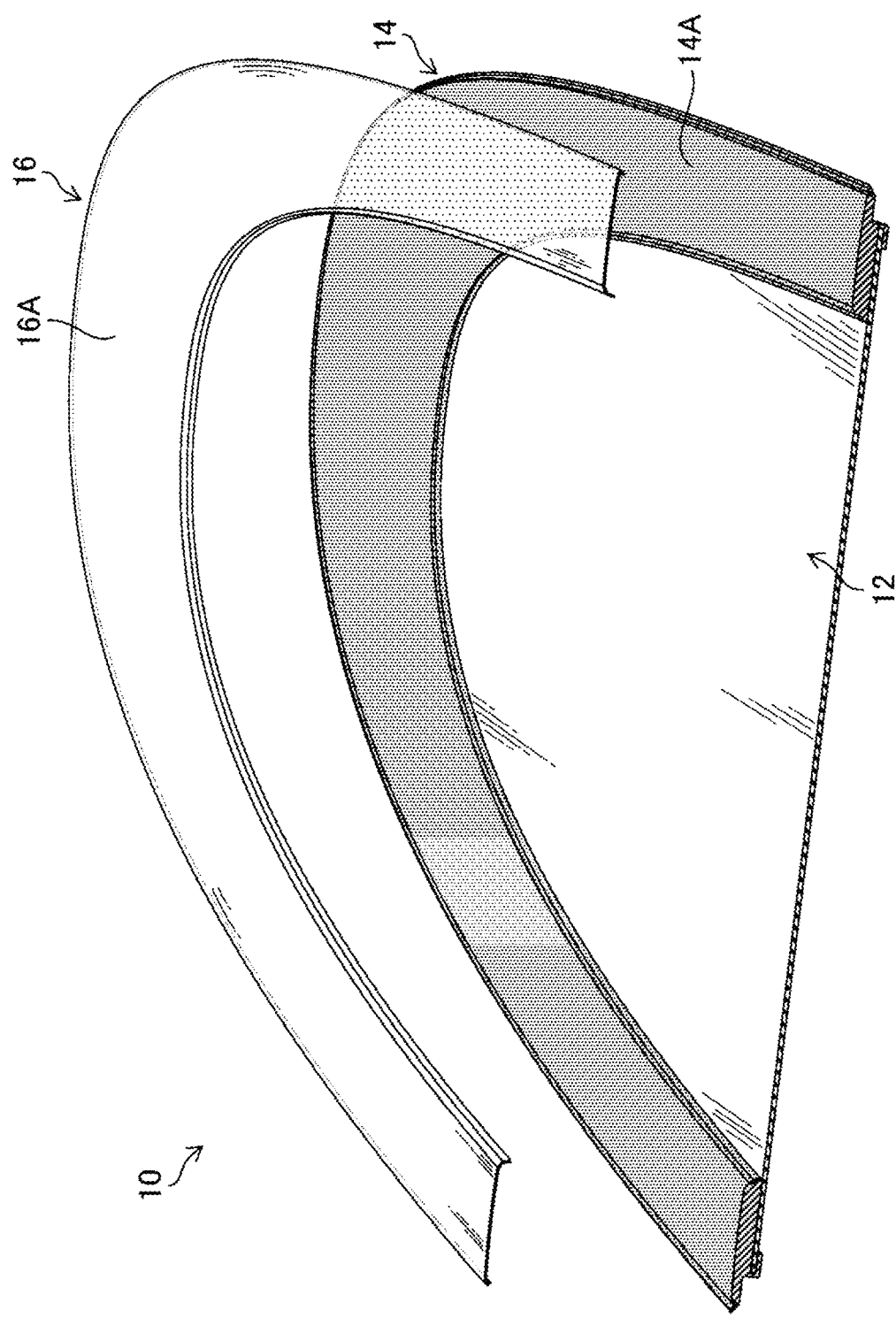
FIG. 3 is an oblique view illustrating the resin frame and the decorative molding apart from each other.

FIG. 3 is an oblique view illustrating the resin frame 14 and the decorative molding 16 apart from each other. As shown in FIG. 3, the decorative molding 16 in this example is a transparent design film 20, for example, a shaped film prepared by shaping a transparent film itself into the above design shape. The decorative molding 16 is disposed on the vehicle exterior side when the glass plate 10 with resin frame is attached to a vehicle.

In this example, as the design film 20, an acrylic film is employed. An acrylic film has high transparency (total light transmittance of 92% (measured by the measurement method in accordance with ISO-13468-1, JIS-K-7361-1)). As a result, with the glass plate 10 with resin frame of this example, black color of the surface 14A of the resin frame 14 can be expressed (visually recognized) through the design film 20. Thus, when black color of the surface 14A of the resin frame 14 is expressed through the transparent design film 20 in such a manner, high gloss of the design surface in black can be achieved as compared with a case where the black color is expressed e.g. by attaching a black film to a surface to be exposed to the vehicle exterior side of the decorative molding, or by applying a black coating material. Further, since the design film 20 is provided on the vehicle exterior side of the surface 14A of the resin frame 14, the surface 14A of the resin frame 14 can be protected by the design film 20. Particularly, an acrylic film, which has high abrasion resistance, can protect the resin frame 14. That is, the design film 20 is preferably an acrylic film, whereby the surface 16A is less likely to be scarred even when it is exposed to the outside of the vehicle.

As described above, by the glass plate 10 with resin frame according to the present embodiment, the decorative molding 16 is the transparent design film 20 and the decorative molding 16 is disposed on the vehicle exterior side when the glass plate 10 with resin frame is attached to a vehicle, and thus, the surface 14A (design surface) of the resin frame 14 expressed by the decorative molding 16 can be protected by the decorative molding 16, and high gloss of the surface 14A (design surface) in black of the resin frame 14 can be achieved.

In the above embodiment, an acrylic film is employed as the design film 20, however, the design film 20 is not limited thereto, and another transparent film (such as a transparent film formed of polycarbonate, polyvinyl chloride or polyethylene terephthalate) may be employed. However, considering the transparency to achieve high gloss of the surface 14A in black of the resin frame 14, the total light transmittance of the design film is preferably 80% or more, and from such a viewpoint, a polycarbonate film having a total light transmittance of 87% can substitute. In such a case, since the polycarbonate film is flexible and has low abrasion resistance as compared with an acrylic film, it is preferred to form a hard coat layer on the surface (on the vehicle exterior side) of the polycarbonate film. The hard coat layer may be formed by applying a coating agent containing a resin achieving high surface hardness, such as an acrylic, melamine, urethane, epoxy or silicone resin. The thickness of the design film 20 is not particularly limited, and may, for example, be 0.3 mm or more and 1.0 mm or less.

[Method for Producing Glass Plate with Resin Frame]

Figure 4:
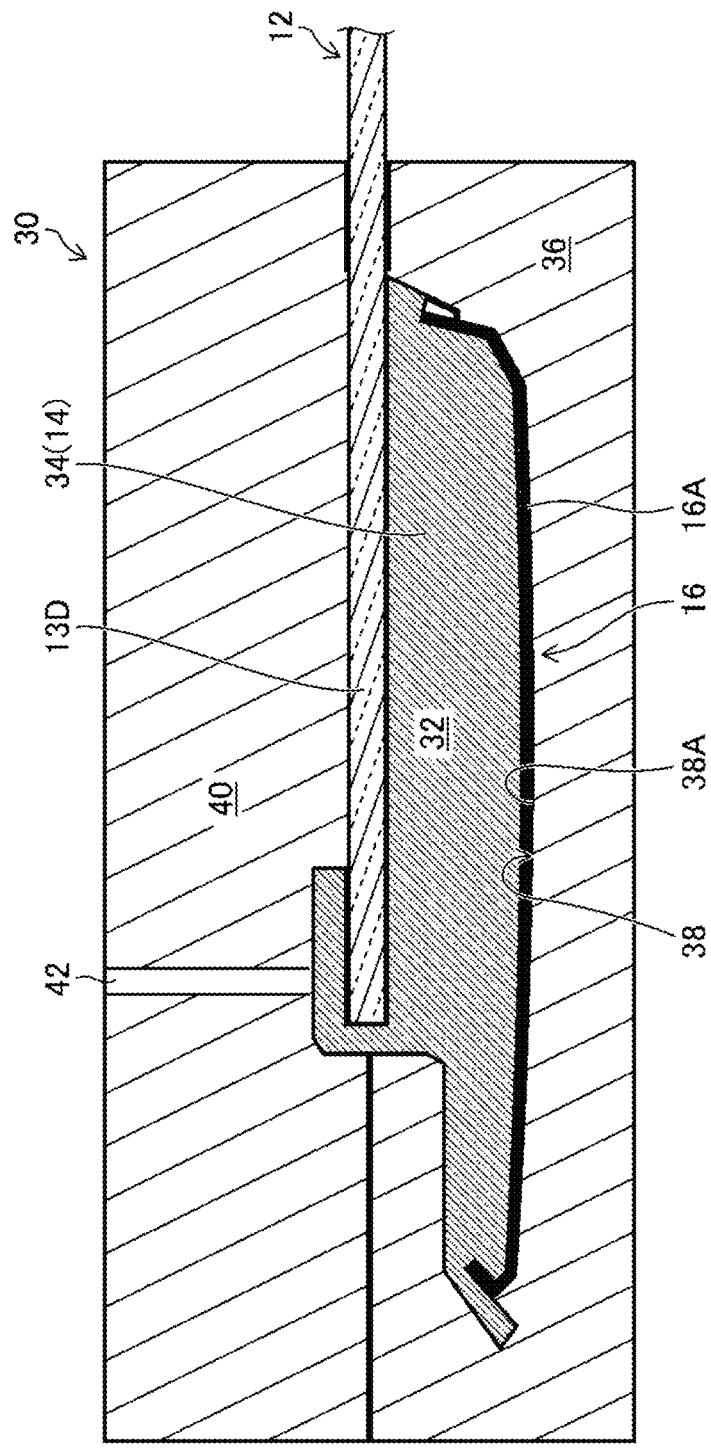
FIG. 4 is a cross sectional view illustrating a mold to produce the glass plate with resin frame shown in FIG. 1.
Figure 5:
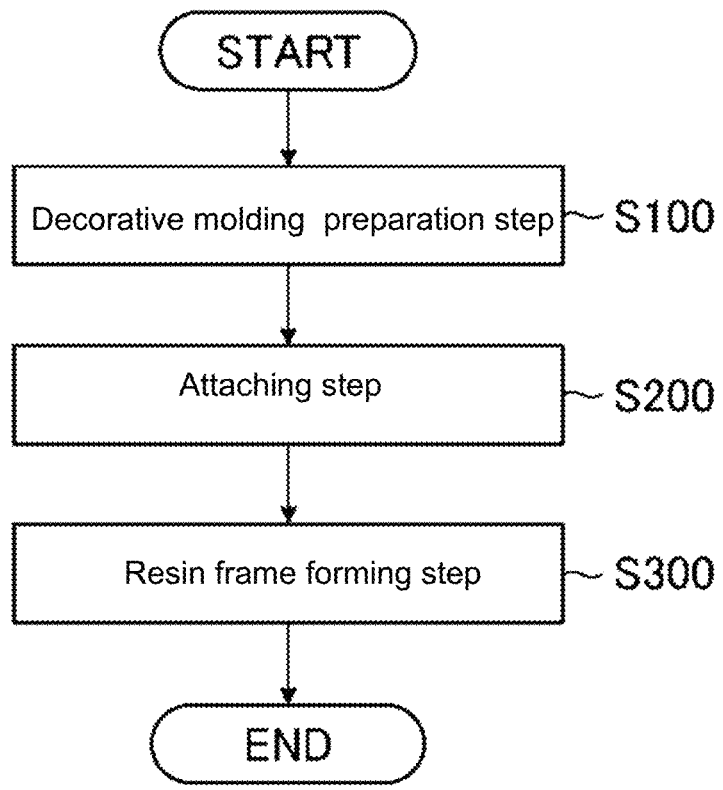
FIG. 5 is a flow chart illustrating a method for producing the glass plate with resin frame shown in FIG. 1.

Now, the method for producing the glass plate 10 with resin frame according an embodiment of the present invention will be described with reference to FIG. 4 illustrating the mold 30 and the flow chart illustrating the production method shown in FIG. 5. FIG. 4 illustrates a case where a molten resin 34 to be the resin frame 14 has already been injected into the cavity 32 of the mold 30, however, in the following, description will be made in order from a state before the molten resin 34 is injected into the cavity 32.

The production method in the present embodiment roughly comprises a decorative molding preparation step (S100), an attaching step (S200) and a resin frame forming step (S300).

In the decorative molding preparation step (S100), first, a transparent acrylic film cut in accordance with the size of the decorative molding 16 is attached to a mold of a high pressure shaping machine, and then pressed against the mold by a compressed air pressure and shaped into the shape of the mold, whereby a transparent design film 20 as the decorative molding 16 is prepared. Further, by printing a production design (e.g. characters) on the film before shaping by the high pressure shaping machine, a design film 20 having a production design imparted can be obtained. Further, by engraving the shaping surface of the mold with production information such as characters or symbols and transcribing the information on the film at the time of shaping, a design film 20 having product information expressed as indented patterns can be obtained.

Then, in the attaching step (S200), as shown in FIG. 4, the surface 16A of the decorative molding 16 is attached to the inner face 38 of a lower mold 36 constituting the mold 30. The inner face 38 has dents 38A, which function as a dedicated attachment portion to dispose the decorative molding 16 to the resin frame 14.

Then, the peripheral portion 13D of the glass plate 12 is attached to a predetermined position of the lower mold 36. Then, an upper mold 40 of the mold 30 is fixed to the lower mold 36, whereby the cavity 32 is formed between the lower mold 36 and the upper mold 40, and in the cavity 32, the decorative molding 16 and the peripheral portion 13D of the glass plate 12 are contained, whereby the attaching step (S200) ends.

Then, in the resin frame forming step (S300), for example, the molten resin 34 is injected from a resin inlet 42 provided in the upper mold 40 into the cavity 32 to fill the cavity 32 with the molten resin 34. Then, the lower mold 36 and the upper mold 40 are separated from each other, whereby the resin frame forming step (S300) ends. By means of such steps, the glass plate 10 with resin frame shown in FIG. 1 is produced.

By the above production method, it is possible to produce the glass plate 10 with resin frame, in which the surface 14A (design surface) of the resin frame 14 expressed by the decorative molding 16 can be protected, and high gloss of the surface 14A (design surface) in a color of the resin frame 14 can be achieved.

<Modified Example of Decorative Molding>

Figure 6A:
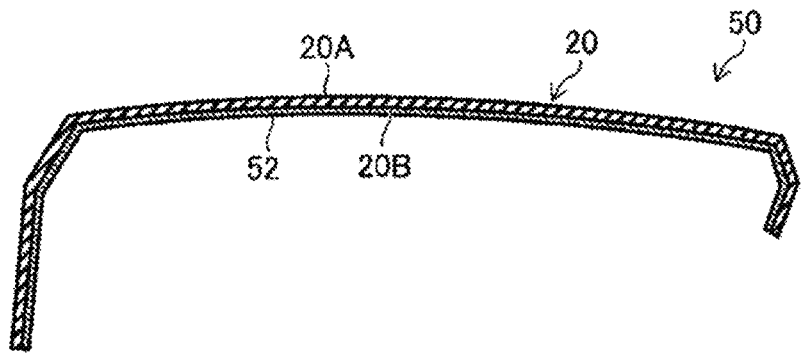
FIGS. 6A, 6B and 6C are cross sectional views illustrating first, second and third modified examples of the decorative molding respectively.

FIG. 6A is a cross sectional view illustrating a decorative molding 50 according to a first modified example. In description of the decorative molding 50, members the same as or similar to the members in the decorative molding 16 shown in FIG. 2 are represented by the same symbols and their description is omitted.

The design film 20 constituting the decorative molding 50 has a first face 20A facing the vehicle exterior side and a second face 20B facing the vehicle interior side, and the second face 20B is colored for example black. That is, in the decorative molding 50 in the first modified example, the second face 20B of the design film 20 functions as the design surface. In FIG. 6A, a black colored layer 52 formed on the second face 20B of the design film 20 is shown, and the colored layer 52 is formed by depositing, printing or applying a pigment.

Even in a case where the second face 20B of the design film 20 is colored, as in the first modified example, the black color can be expressed through the transparent design film 20, whereby high gloss of the second face 20B in black expressed by the decorative molding 50 can be achieved. Further, since the second face 20B of the design film 20 faces the vehicle interior side, the second face 20B can be protected by the design film 20. The colored layer 52 is not limited to black and may have another color. High gloss in another color can also be achieved through the transparent design film 20.

Figure 6B:
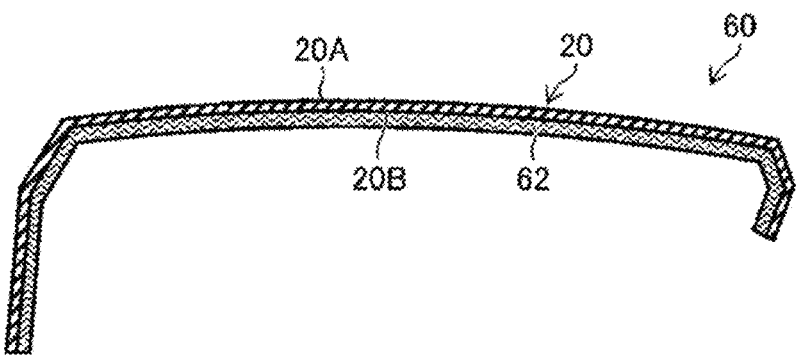

FIG. 6B is a cross sectional view illustrating a decorative molding 60 according to the second modified example. In description of the decorative molding 60, members the same as or similar to the members in the decorative molding 16 shown in FIG. 2 are represented by the same symbols and their description is omitted.

The design film 20 constituting the decorative molding 60 has a first face 20A facing the vehicle exterior side and a second face 20B facing the vehicle interior side, and has, on the second face 20B, a transparent reinforcing film 62 having impact resistance higher than the design film 20.

By the decorative molding 60 according to the second modified example, the design film 20 can be reinforced by the reinforcing film 62. In such a case, the reinforcing film 62 is preferably a film having a total light transmittance of 80% or more, whereby high gloss of the surface 14A in black of the resin frame 14 (see FIG. 3) expressed by the decorative molding 60 can be achieved.

Further, the reinforcing film 62 is preferably a shaped film formed by shaping in the same manner as the design film 20. That is, the design film 20 before shaping and the reinforcing film 62 are bonded by a transparent adhesive, followed by shaping by a high pressure shaping machine, to prepare the decorative molding 60. In such a manner, the transparent decorative molding 60 can be prepared.

Further, it is preferred to employ an acrylic film as the design film 20 and a polycarbonate film as the reinforcing film 62. In such a case, since the acrylic film having high abrasion resistance is located on the vehicle exterior side, scarring of the decorative molding 60 can be suppressed, and since the polycarbonate film having high impact resistance is disposed between the design film 20 and the resin frame 14, the impact resistance of the decorative molding 60 can be improved. That is, the decorative molding 60 having advantages of both the acrylic film and the polycarbonate can be provided.

Figure 6C:
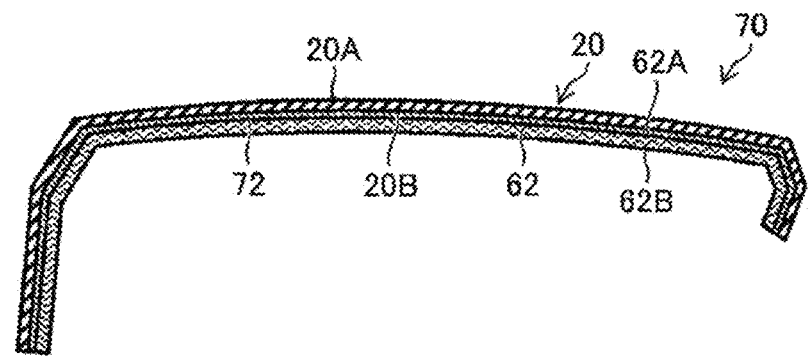

FIG. 6C is a cross sectional view illustrating a decorative molding 70 according to a third modified example. In description of the decorative molding 70, members the same as or similar to the members in the decorative molding 60 shown in FIG. 6B are represented by the same symbols and their description is omitted.

In the decorative molding 70 according to the third modified example, in the same manner as the decorative molding 60 of the second modified example, the design film 20 has on the second face 20B a transparent reinforcing film 62 having impact resistance higher than the design film 20, and the second face 20B of the design film 20 is colored in the same manner as the decorative molding 50 of the first modified example. In FIG. 6C, on the second face 20B of the design film 20, a block colored layer 72 is shown.

By the decorative molding 70 according to the third modified example, while abrasion resistance and impact resistance of the decorative molding 70 are improved by the design film 20 and the reinforcing film 62, high gloss of the second face 20B in black of the design film 20 can be achieved. Further, the second face 20B of the design film 20 can be protected by the design film 20.

In a decorative molding according to a fourth modified example, which is not shown, and which will be described with reference to FIG. 6C, the reinforcing film 62 has a first face 62A facing the vehicle exterior side and a second face 62B facing the vehicle interior side, and the first face 62A or the second face 62B is colored black. The decorative molding according to the fourth modified example also achieves the same effects as the decorative molding 70 of the third modified example.

Figure 7:
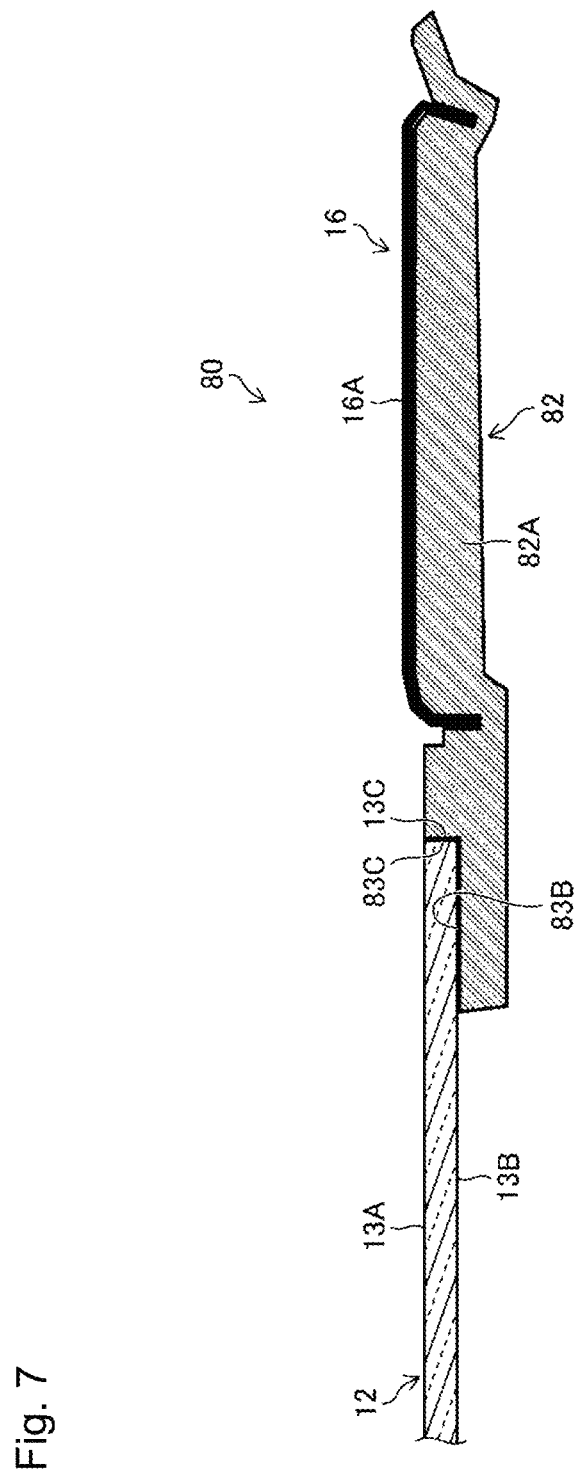
FIG. 7 is a cross sectional view illustrating a substantial part of the glass plate with resin frame according to another embodiment of the present invention.

FIG. 7 is a cross sectional view illustrating a substantial part of a glass plate 80 with resin frame according to another embodiment of the present invention. In description of the glass plate 80 with resin frame, members the same as or similar to the members in the glass plate 10 with resin frame shown in FIGS. 1 and 2 are represented by the same symbols and their description is omitted.

The difference between the glass plate 80 with resin frame shown in FIG. 7 and the glass plate 10 with resin frame shown in FIGS. 1 and 2 is that the resin frame 14 of the glass plate 10 with resin frame is a three-sided molding, whereas the resin frame 82 of the glass plate 80 with resin frame is a two-sided molding.

The two-sided molding has such a shape that the resin frame 82 has two inner faces 83B and 83C in contact with the vehicle interior side surface 13B and the edge surface 13C of the glass plate 12, and the resin frame 82 does not protrude from the vehicle exterior side surface 13A of the glass plate 12. The two-sided molding can realize a flush surface of the vehicle body as compared with the three-sided molding since the resin frame 82 does not protrude to the outside of the vehicle body.

Even such a glass plate 80 with resin frame having the two-sided molding, can achieve the same effects as the glass plate 10 with resin frame shown in FIGS. 1 and 2, by disposing the decorative molding 16 on the resin frame 82 located on the out-of-plane direction of the glass plate 12.

The glass plate with resin frame and the method for producing the glass plate with resin frame of the present invention are described above. However, it should be understood that the technique of the present invention is not limited to such embodiments, and various changes and modifications are possible without departing from the intension and the scope of the present invention.

REFERENCE SYMBOLS

10: glass plate with resin frame, 12: glass plate, 14: resin frame, 16: decorative molding, 20: design film, 30:

mold, 32: cavity, 34: molten resin, 36: lower mold, 38: inner face, 40: upper mold, 42: resin inlet, 50: decorative molding, 52: colored layer, 60: decorative molding, 62: reinforcing film, 70: decorative molding, 72: colored layer, 80: glass plate with resin frame, 82: resin frame

What is claimed is:

1. A glass plate with resin frame, which comprises:
a glass plate;
a resin frame provided on a peripheral portion of the glass plate; and
a transparent design film disposed on the resin frame, the resin frame being formed integrally with the glass plate and the transparent design film,
wherein:
the transparent design film is disposed directly on the resin frame, and
when the glass plate with resin frame is attached to a vehicle, the transparent design film is disposed on the vehicle exterior side.

2. The glass plate with resin frame according to claim 1, wherein the transparent design film has a total light transmittance of 80% or more.

3. The glass plate with resin frame according to claim 1, wherein the transparent design film is a shaped film.

4. The glass plate with resin frame according to claim 1, wherein the transparent design film has a first face facing the vehicle exterior side and a second face facing the vehicle interior side, and the second face is colored.

5. The glass plate with resin frame according to claim 1, wherein the transparent design film is an acrylic film.

6. The glass plate with resin frame according to claim 1, wherein the transparent design film has a first face facing the vehicle exterior side and a second face facing the vehicle interior side, and the transparent design film has, on the second face, a transparent reinforcing film having higher impact resistance than the transparent design film.

7. The glass plate with resin frame according to claim 6, wherein the reinforcing film has a total light transmittance of 80% or more.

8. The glass plate with resin frame according to claim 6, wherein the transparent design film and the reinforcing film are shaped films.

9. The glass plate with resin frame according to claim 6, wherein the reinforcing film has a first face facing the vehicle exterior side and a second face facing the vehicle interior side, and
the first face or the second face of the reinforcing film is colored.

10. The glass plate with resin frame according to claim 6, wherein the transparent design film is an acrylic film, and the reinforcing film is a polycarbonate film.

11. The glass plate with resin frame according to claim 1, wherein the resin frame is colored.

* * * * *